United States Patent [19]

Chung et al.

[11] Patent Number: 5,093,433

[45] Date of Patent: Mar. 3, 1992

[54] FUNCTIONAL POLYCYCLOPENTADIENE RESINS VIA HYDROBORATION PROCESS

[75] Inventors: Tze-Chiang Chung, State College, Pa.; Encok Berluche, Phllipsburg; Jan Bock, Bridgewater, both of N.J.; Rodney V. Kastrup, Humble, Tex.

[73] Assignee: Exxon Research and Engineering Company, Florham Park, N.J.

[21] Appl. No.: 495,676

[22] Filed: Mar. 19, 1990

[51] Int. Cl.$^5$ .............................................. C08F 8/34
[52] U.S. Cl. ..................... 525/337; 525/332.1; 525/344; 525/366; 525/369; 525/377; 525/384
[58] Field of Search ............... 525/337, 344, 366, 369, 525/377, 384

[56] References Cited

U.S. PATENT DOCUMENTS

| | | | |
|---|---|---|---|
| 4,639,498 | 1/1987 | Ritter | 525/251 |
| 4,734,472 | 3/1980 | Chung | 525/337 |
| 4,751,276 | 1/1988 | Chung | 525/326.6 |
| 4,950,712 | 8/1990 | Letourneor et al. | 525/333.6 |

*Primary Examiner*—Bernard Lipman
*Attorney, Agent, or Firm*—Richard E. Nanfeldt; Joseph J. Dvorak

[57] ABSTRACT

A process for preparing a functionalized petroleum resin which comprises the steps of: dissolving a petroleum resin having a norbornene moiety with a double bond in a solvent to form a solution; adding to the solution a borane compound having the formula:

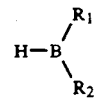

wherein $R_1$ and $R_2$ are alkyl or cycloalkyl groups having about 1 to about 10 carbonations; reacting said petroleum resin with said borane compound at about room temperature for a sufficient period of time to form a borane intermediate; and reacting said borane intermediate with a chemical agent to convert said borane intermediate into said functionalized petroleum resin.

7 Claims, No Drawings

FUNCTIONAL POLYCYCLOPENTADIENE RESINS VIA HYDROBORATION PROCESS

FIELD OF THE INVENTION

The present invention relates to a novel process for the preparation of novel functional petroleum resins through a borane intermediate produced by a monohydroboration process, wherein the borane intermediate is easily converted to a variety of other functionalities, e.g., alcohols, acids, aldehydes or amines. The functionalized polycyclopentadiene resins prepared according to this invention may be used as additive resin for printing ink.

BACKGROUND OF THE INVENTION

It is well known that petroleum resins are prepared by thermal polymerization of feeds obtained from petroleum refining, which contain mainly cyclopentadiene, dicyclopentadiene and alkyl-substituted derivatives of any of those. The polymerization temperature is usually between 200° C. and 350° C. The resulting resin has molecule weight between 200 to 1000 and has a yellow crystalline appearance. It is believed that the reaction process involves two mechanisms, Diel-Alder cycloaddition and free radical propagation. As expected, the final resin is not a single compound but contains many possible molecular structures.

Because of the abundance and availability of petroleum resins, there has been a tendency to use them as additive resin in printing inks. However, these resins have suffered from two generic disadvantages, (i) poor high temperature and UV stability and (ii) low compatibility with polar materials. The instability is due to the unsaturation in the resin. Hydrogenation reactions have been carried out to remove the double bond and simultaneously minimize the color. On the other hand, to improve the compatibility of petroleum resin with basic polymers, such as polyurethane or with pigments, a polar group is introduced to petroleum resins to enhance intermolecular interaction.

There has been much prior art describing the preparation of polar group containing resins. The best known compound is maleic anhydride modified resin which can be obtained either by direct copolymerization of maleic anhydride and cyclopentadiene derivatives, or by subsequent reaction of petroleum resin with maleic anhydride. However, both processes suffer from contamination and gelation due to insufficient conversion and side reactions. Moreover, those reactions do not substantially reduce the double bond content, so that the thermal stability is not entirely satisfactory.

To introduce hydroxyl and ester groups to petroleum resins, it has been reported to copolymerized dicyclopentadiene with alkyl alcohol, methacryl alcohol, acrylic ester, methacrylic ester, and vinyl ester. However, the cycloaddition products and vinyl co-monomers often have low reactivity, and resulting low level of incorporation. As expected, those materials also suffer from the thermal instability at high temperature due to bonds with unsaturation.

Borane compounds are valuable intermediates in organic synthesis (H. C. Brown, Organic Synthesis Via Borane, Wiley-Interscience, 1975). Many functional groups, such as —$NH_2$, —OH, —COOH, —COH, etc., can be obtained from a borane moiety under mild conditions. However, the borane group containing petroleum resins are new and the selective hydroboration of the double bond in norbornene is novel, which allows us to obtain thermally stable functional resins with locally well-defined molecular structure.

SUMMARY OF THE INVENTION

The present invention relates to a novel process for the preparation of novel functional petroleum resins through a borane intermediate produced by a monohydroboration process, wherein the borane intermediate is easily converted to a variety of other functionalities, e.g., alcohols, acids, aldehydes or amines. The functional polycyclopentadiene resins prepared according to this invention may be used as additive resin for printing ink.

It is an object of this invention, therefore, to provide a process for producing a series of functional petroleum resins with a broad range of concentration and nature of functional groups. At the same time, the most active double bonds were also removed and the resulting functional resins have higher thermal and UV stability.

GENERAL DESCRIPTION

The present invention relates to a process for the preparation of functionalized petroleum resins. A petroleum resin containing a norbornene with a double bond is reacted with a borane compound to form a borane intermediate. The borane intermediate is then oxidized with $NaOH/H_2O_2$ to form an alcohol or alternatively with $NH_2 OSO_3H$ to form an amine or alternatively with $CO/K(i-CH_3H_7O)_3BH$ to form an aldehyde, or with a $PhOCH2COOH$/lithium diisopropylamide to form an acid.

To be able to control the modification process, the detailed molecular structure of the parent petroleum resin was examined by GPC, IR, $^1$H NMR, and $^{13}$C NMR-APT (attached proton test) techniques. As expected, there are few unsaturated double bonds in each molecule. The nature of them was revealed in the $^1$H NMR spectrum. Two distinctive chemical shifts are found to be characteristic of double bonds: one is between 5.9–6.2 ppm, corresponding to double bonds in norbornene; the other is between 5.3–5.7 ppm, corresponding to double bonds in cyclopentene. The mole ratio between them is about 1 to 2. The Diels-Alder reaction of cyclopentadiene will end up with an equal amount of double bonds. The low concentration of double bonds in norbornene units is due to free radical reaction in norbornene. With the number average molecular weight ~400 (approximately corresponding to a hexamer of cyclopentadiene) by GPC measurement, it lead to the belief that the average molecular structure is as shown below:

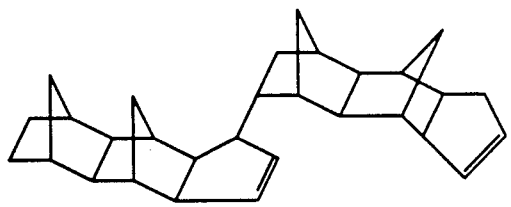

Each oligomer contains one double bond of norbornene at the end of the molecule and, on average, two double bonds in cyclopentene. The skeleton of multiple cyclic units were observed by $^{13}$C NMR-APT experiment, which distinguishes carbons with different numbers of protons. The C and $CH_2$ resonances show positive intensity, while the CH and $CH_3$ resonances have negative intensity. The majority of the saturated carbons are tertiary structure (—C—H) with only one proton bonding to carbon. A low intensity of chemical shifts corresponds to $CH_2$ structure and small amount of $CH_3$ were also seen in this spectrum, which is due to a derivative of cyclopentadiene.

The hydroboration was used to convert double bonds to functional groups as well as to decolarize the material. The boranes can be used having a formula:

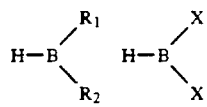

wherein $R_1$ and $R_2$ represents the same or different proton, alkyl or cycloalkyl groups, and X is a halide. After mixing one equivalent of dialkylborane (such as 9-BBN) with petroleum resin (based on average molecule weight 400) for 1 hour at room temperature, the borane moiety was oxidized to an hydroxyl group. Both IR and $^{13}C$ NMR spectra of the resulting resin show that only one type of double bond has been converted to an hydroxyl group, with minimum disruption of the other type of double bond and basic cyclic structure. The $^{13}C$ NMR spectra shows a selective reaction at the double bond which has a chemical shift at 135.4 ppm and simultaneous formation of secondary alcohol with chemical shift at 71 ppm. The nature of the reacting double bond is revealed by $^1H$ NMR spectrum. The chemical shifts (5.9-6.2 ppm) for the double bond in norbornene were completely diminished, while the chemical shifts for the double bond in 5-member rings were almost unaffected.

The selective hydroboration of norbornene is important, since it not only functionalizes the resin, but also removes the most unstable double bonds. Indeed, the TGA measurements show a significant increase in thermal stability. No weight loss in the modified compound can be detected before 300° C., while the parent resin starts to decompose below 150° C. It is equally important to point out that the multiple cyclic structure was retained during modification. As shown in the $^{13}C$ NMR APT experiment, tertiary carbons on the ring stay the same; no ring opening reaction can be detected. IR studies confirm this result. We compared IR spectra of parent and hydroxylated resins. After modification, the intensity of double bond decrease with the appearance of two peaks at $\nu OH = 3300$ cm$^{-1}$ and $\nu C$—$O = 1060$ cm$^{-1}$, corresponding to hydroxyl group.

The functionalization process of this invention is a selective hydroboration and oxidation on the double bond in the norbornene moiety of petroleum resin. The resulting hydroxyl resin is shown below:

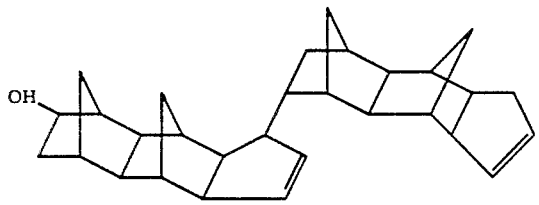

Higher degree of modification in petroleum resin can also be achieved by simply adding more than one equivalent amount of dialkylborane during the hydroboration reaction. In IR spectra the intensities of all absorption bands characteristic of double bonds decrease with the simultaneous increase in two absorption bands, $\sqrt{}/OH = 3300$ cm$^{-1}$ and $\sqrt{}C$—O—1050 cm$^{-1}$, characteristic of hydroxyl group. After adding three equivalent amounts of dialkylborane, all the double bonds, both on norbornene and cyclopentene moieties, disappeared. This result is another indication of the average number of double bonds (~3) in one petroleum resin, and that the hydroboration process can be used to obtain multiple functional groups in each molecule.

While the hydroxyl group modified resins have been described in detail, it will, of course within the scope and spirit of this invention, be apparent that other modified resins containing various functional groups, such as —COOH, —COH, —NH$_2$, —NHR, etc., can also be prepared through this route. The direct conversion from borane moieties to other functional groups is well described by H. C. Brown, (Organic Synthesis Via Boranes, Wiley-Interscience, 1975).

The other way to obtain other functional group containing resins is subsequent modification of the hydroxyl resins. For example, an esterification reaction was carried out by condensation reaction of hydroxylated resins and acetyl anhydride under basic conditions with 2% catalyst, Dimethylaminopyridine (DMAP). After stirring for 4 hours, all hydroxyl groups were converted to ester groups. The IR spectrum of the resulting esterified resin was characterized by a strong C=O absorption band at 1750 cm$^{-1}$, while the absorption at 3300 cm$^{-1}$ for hydroxyl groups is diminished. The same result is found in the $^{13}C$ NMR spectra—a strong chemical shift at 170.5 ppm for the carbonyl group is observed. At the same time the chemical shift for the hydroxyl group 71 ppm is completely absent. One of the esterified resin is shown below:

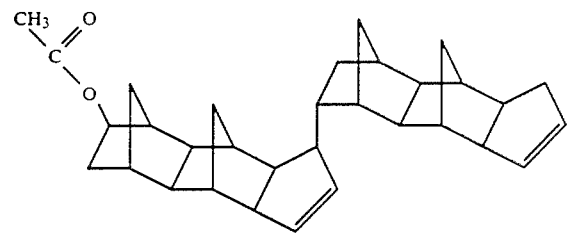

The process of the instant invention is depicted as:

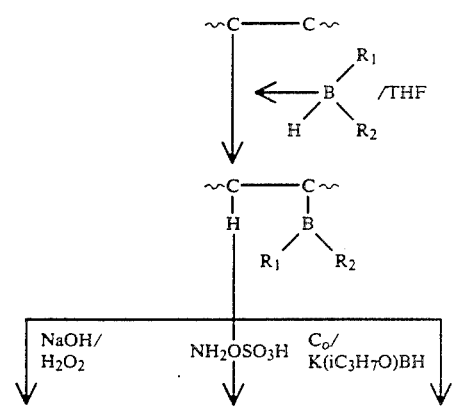

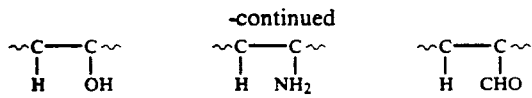

wherein $R_1$ and $R_2$ are alkyl or cycloalkyl groups having about 1 to about 10 carbon atoms, such as [3,3,1] bicyclononane. The borane intermediate can be converted into an alcohol by reaction with an inorganic base/peroxide, such as sodium hydroxide/hydrogen peroxide, at a temperature of about 55° to about 25° C. for about 8 to about 1 hours. Alternatively, the borane intermediate can be reacted with $NH_2O-SO_3H$ or $NH_2Cl$ at a temperature of about 90° to about 100° C. for a period about 3 to about 5 hours to form an amine. The borane intermediate can be reacted with a mixture of $CO/K(i-C_3H_7O)_3BH$ for a period of about 2 to about 5 hours to form an aldehyde. The borane intermediate can be reacted with a dianion of phenoxylacetic acid at refluxing temperature for about 2 to about 4 hours to form an acid. The borane intermediate can be reacted with $N_2CHCN$ at ice-bath temperature to form a nitrile.

DESCRIPTION OF THE PREFERRED EMBODIMENTS

The preparation of functional resins are illustrated by the following examples. These examples are intended only to illustrate the invention and not in any sense to limit the manner in which the invention can be practiced.

EXAMPLE 1

The Characterization of Petroleum Resin

The petroleum resin is characterized by GPC, IR, 1H NMR, and $^{13}C$ NMR-APT techniques. Based on GPC analysis, more than 90% of the resin has molecule weight between 100 and 800, and the number average molecule weight is about 400, which corresponds to a hexamer of cyclopentadiene. The local molecular structure of this oligomer can be understood by $^1H$ and $^{13}C$ NMR-ATP techniques. In $^{13}C$ NMR spectrum, two broad bands are observed: one at 20-60 ppm corresponding to saturated carbons and the other at 120-140 ppm corresponding to unsaturated carbons. To understand both broad bands in detail, an Attached Proton Test, APT, was applied to resolve the band into several resonance structures which distinguish carbons with different numbers of protons, such as C, CH, $CH_2$, and $CH_3$. The majority of the saturated carbon shows strong negative intensity between 60 and 40 ppm and is tertiary carbon —C—H. Some positive intensity between 39 and 23 ppm is due to $CH_2$ chemical shift; a small amount of $CH_3$, negative intensity at 14 ppm, may be due to methyl cyclopentadiene. On the other hand, the band (123-137 ppm) shows a negative intensity, implying unsaturated carbon of =C—H which are located in cyclopentene and in norbornene. Overall, the results are consistent with the molecule of multiple cyclic structure as shown before.

The detailed nature of the double bonds was further explored by $^1H$ NMR spectrum. Two distinctive chemical shifts of double bond were observed: one (5.9-6.2 ppm), corresponding to the double bond in norbornene, and the other (5.3-5.7 ppm) corresponding to the double bond in cyclopentene. The intensity ratio between them is about 2. This is also in good agreement with that of the proposed average molecular structure.

EXAMPLE 2

Preparation of Functional Resin with 1 eq. Hydroxyl Group

Under an inert atmosphere, a dry three neck 500 ml flask equipped with a magnetic stirring bar was charged with 15 g of petroleum resin and 150 ml THF, which was purified by distillation over $Na^+$ $NAPH^-$. After resin as completely dissolved in THF, 4 g of 9-borobicyclononane (9-BBN) was added into the reactor. The mixture was stirred at room temperature for 1 hour before injecting 10 ml of methanol to terminate the reaction. The $NaOH/H_2O_2$ reagents were used to oxidize borane group to hydroxyl group. An additional funnel was then connected to the flask under a strong nitrogen flow. The 5.6 ml (6N) NaOH solution was deoxygenated in additional funnel by bubbling nitrogen through the solution for five minutes before adding it into the reactor. A similar deoxygenation process was done for 11.4 ml, 30% $H_2O_2$. Temperature of the solution was maintained at −10° C. during the dropwise addition of $H_2O_2$ agent. The resulting mixture as then heated up to 50° C. for 1 hour to complete the oxidation reaction. After cooling down the solution to room temperature, the hydroxylated resins were then precipitated from solution by adding 200 ml water. After washing with methanol several times, the final product was dried in vacuum oven for 12 hours resulting in 15 g white powder. The overall yield in this process was almost quantitative.

The molecule structure of the hydroxyl resin from Example 2) was analyzed by IR $^1H$ NMR, and $^{13}C$ NMR-ATP techniques. Comparing IR spectra before and after modification, two new peaks at $\sqrt{}OH=3300$ $cm^{-1}$ and $\sqrt{}C-O=1060$ $cm^{-1}$ were observed after modification. These clearly correspond to the hydroxyl group functionalization. In $^1H$ NMR spectrum, the chemical shifts (5.9-6.2 ppm) for the double bond in norbornene were completely diminished, while the chemical shifts (5.3-5.7 ppm) for the double bond in cyclopentene were relatively unaffected. Moreover, the multiple cyclic structure was unchanged during modification. As shown in the $^{13}C$ NMR-APT experiment, tertiary carbon on the ring stayed the same, and secondary alcohol was shown at 71 ppm.

EXAMPLE 3

Preparation of Functional Resins With 2 eq. Hydroxyl Group

Following the procedure of example 2, 15 g of polycyclopentadiene resin was reacted with 9 g of 9-BBN (2 equivalent to resin) in 200 ml THF solvent. The reaction was affected with constant stirring at 40° C. After a period of 2 hours, 10 ml of methanol was used to terminate the hydroboration. The hydroborated resin was then oxidized by $NaOH/H_2O_2$ solution, 12.6 ml of 6N NaOH and 25.4 ml of 30% $H_2O_2$. To ensure the complete reaction, the mixture as heated up to 50° C. for 1 hour. After cooling down to room temperature, the hydroxyl resin was precipitated from solution by adding 200 ml water, than washed with methanol several times. The drying process was done in a vacuum oven overnight; 15.6 g white powder was obtained with overall yield-90%. Comparing IR spectra of hydroxyl resins with 1 and 2 equivalent hydroxyl groups, a significant decrease in intensity at $\sqrt{}C-H=3040$ $cm^{-1}$ and increase at $\sqrt{}$O—H=3300 cm$^{-1}$ and $\sqrt{}$C—O=1060 cm$^{-1}$ was observed.

EXAMPLE 4

Preparation of Functional Resin With 3 eq. Hydroxyl Group

Following the procedure of example 2, 15 g of petroleum resin was mixed with 13.5 g of 9-BBN (3 equivalent to resin) and 300 ml THF solvent under a nitrogen atmosphere. The mixture was stirred at room temperature for 3 hours. The unreacted 9-BBN was terminated by adding 10 ml of methanol. A 19 ml (6N) NaOH solution was injected into the reactor, followed by dropwise 38.3 ml, 33% $H_2O_2$ at $-10°$ C. for over half hour. The resulting mixture was then heated up to 50° C. for 1 hour to complete the oxidation. After cooling down to room temperature, the modified resin was then precipitated from solution by adding 300 ml water. After filtering and washing, the wet resin was then dried in vacuum oven overnight, and 15.2 g of white powder was obtained. The molecular structure of hydroxyl resin was identified by the IR spectrum: very strong absorption peaks, $\sqrt{}$OH=3300 cm$^{-1}$ and $\sqrt{}$C—O=1060 cm$^{-1}$, for hydroxyl group, and almost no vibration mode for the double bond.

EXAMPLE 5

Preparation of Functional Resin with Ester Group

In an inert atmosphere, 10 g of hydroxylated resin from example 2 was dissolved into 100 ml THF solution. A 2.56 g of triethylamine was added before injecting 2.56 g of acetyl anhydride into the reaction. After sufficient mixing, 0.2 g of dimethylaminopyridine was added as a catalyst. The mixture was then stirred at room temperature for 6 hours to complete the reaction. The resulting resin was then precipitated by adding methanol into the solution. The precipitate was collected by filtration, washed with methanol several times, and vacuum dried overnight to yield 12.5 g of functional resin with ester groups. Both $^{13}$C NMR and IR experiments clearly show a complete reaction to convert the hydroxyl group to the ester group.

Comparing the $^{13}$C NMR spectra of two functional resins, before and after esterification, the only changes are two new chemical shifts at 70.5 ppm (C=O) and 21.4 ppm ($CH_3$-in acetyl group) and a complete disappearance of the chemical shift at 71 ppm for the secondary alcohol group. A similar conclusion is obtained by comparing the IR spectra. The vibration modes $\sqrt{}$O—H=3300 cm$^1$ and $\sqrt{}$C—O=1060 cm$^{-1}$ have completely disappeared, and the vibration modes $\sqrt{}$C=O=1730 cm$^{-1}$ and $\sqrt{}$C—O—C=1240 cm$^{-1}$ for ester group have very strong intensities.

EXAMPLE 6

Thermal Stability of Both Hydroxylated and Esterified Resins

The thermal properties of both hydroxylated (example 2) estified (example 5) resins were evaluated by Perkin-Elmer TGS-2 thermogrammetric analyzer. A sample size of 10 mg and a heating rate of 10° C./min in nitrogen atmosphere were used. Both modified resins exhibit surprising thermal stability; no weight loss can be detected before 300° C., while the non-functionalized resin start to decompose at 150° C.

What is claimed is:

1. A process for preparing a functionalized petroleum resin which comprises the steps of:
   (a) dissolving a petroleum resin in a solvent to form a solution, the resin being formed by polymerizing feeds containing cyclopentadiene, dicyclopentadiene and alkyl derivatives thereof, the resin having a norbornene moiety with a double bond;
   (b) adding to the solution a borane compound having the formula:

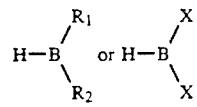

wherein $R_1$ and $R_2$ are alkyl or cycloalkyl groups having about 1 to about 10 carbon atoms and wherein X is a halogen;
   (c) reacting said petroleum resin with said borane compound at about room temperature for a sufficient period of time to form a derivative of the petroleum resin containing a borane group; and
   (d) reacting said derivative of the petroleum resin with a chemical agent capable of replacing the borane group of the petroleum resin derivative with a functional group, thereby converting the derivative into said functionalized petroleum resin.

2. The process according to claim 1 wherein said borane compound has the formula $HBR_1R_2$ and wherein $R_1$ and $R_2$ are bicyclononane.

3. A process according to claim 1 or 2, wherein said chemical agent is $NaOH/H_2O$.

4. A process according to claim 1 or 2, wherein said chemical agent is $NH_2OSO_3H$.

5. A process according to claim 1 or 2, wherein said chemical agent is a mixture of $CO/K(i-C_3H_7O)_3BH$.

6. A process according to claim 1 or 2, wherein said chemical agent is a dianion of phenoxyl-acetic acid.

7. A process according to claim 1 or 2, wherein said chemical agent is $N_2CHCN$.

* * * * *